United States Patent
Huang

(10) Patent No.: US 8,079,150 B2
(45) Date of Patent: Dec. 20, 2011

(54) GARDEN SHEARS

(75) Inventor: Yao-Chung Huang, Fu Shing Hsiang (TW)

(73) Assignee: Ho Cheng Garden Tools Co., Ltd., Chang Hua Hsien (TW)

( * ) Notice: Subject to any disclaimer, the term of this patent is extended or adjusted under 35 U.S.C. 154(b) by 361 days.

(21) Appl. No.: 12/512,984

(22) Filed: Jul. 30, 2009

(65) Prior Publication Data

US 2011/0023309 A1    Feb. 3, 2011

(51) Int. Cl.
*B26B 13/00*    (2006.01)

(52) U.S. Cl. ............................ 30/254; 30/261; 30/262

(58) Field of Classification Search ............... 30/234, 30/236, 244, 249, 251, 254, 260–262; D8/5
See application file for complete search history.

(56) References Cited

U.S. PATENT DOCUMENTS

| | | | | |
|---|---|---|---|---|
| 208,467 A | * | 10/1878 | Conover | 30/261 |
| 309,888 A | * | 12/1884 | Shepard | 30/262 |
| 309,889 A | * | 12/1884 | Shepard | 30/262 |
| 1,700,306 A | * | 1/1929 | Bernard | 30/261 |
| 2,189,211 A | * | 2/1940 | Lind | 30/262 |
| 2,715,270 A | * | 8/1955 | Oxhandler | 30/262 |
| 3,325,896 A | * | 6/1967 | D' Angelo et al. | 30/262 |
| 3,416,226 A | * | 12/1968 | Pfaffenbach | 30/261 |
| 3,602,989 A | * | 9/1971 | Averitt | 30/261 |
| 4,980,975 A | * | 1/1991 | Hodson | 30/262 |
| 5,179,783 A | * | 1/1993 | Melter | 30/262 |
| D336,222 S | * | 6/1993 | Wensley et al. | D8/5 |
| D336,412 S | * | 6/1993 | Wensley et al. | D8/5 |
| D341,526 S | * | 11/1993 | Clivio | D8/5 |
| D341,527 S | * | 11/1993 | Clivio | D8/5 |
| D342,652 S | * | 12/1993 | Wensley et al. | D8/5 |
| D346,538 S | * | 5/1994 | Florian | D8/5 |
| D359,426 S | * | 6/1995 | Her | D8/5 |
| D359,427 S | * | 6/1995 | Birkholz | D8/5 |
| 5,426,857 A | * | 6/1995 | Linden | 30/262 |
| D359,890 S | * | 7/1995 | Wensley | D8/5 |
| D361,700 S | * | 8/1995 | Birkholz | D8/5 |
| D377,588 S | * | 1/1997 | Birkholz | D8/5 |
| D393,189 S | * | 4/1998 | Spear et al. | D8/5 |
| 5,774,991 A | * | 7/1998 | Shi | 30/262 |
| D396,615 S | * | 8/1998 | Spear et al. | D8/5 |
| D446,094 S | * | 8/2001 | Ebert | D8/5 |
| 6,301,787 B2 | * | 10/2001 | Mock | 30/262 |
| D457,402 S | * | 5/2002 | Heck et al. | D8/5 |
| D458,815 S | * | 6/2002 | Meyerratken | D8/5 |
| D458,816 S | * | 6/2002 | Meyerratken | D8/5 |

(Continued)

FOREIGN PATENT DOCUMENTS

GB    2030502 A  *  4/1980

(Continued)

*Primary Examiner* — Jason Daniel Prone

(57) ABSTRACT

A pressing handle is connected to a moveable blade having a hook-shaped engaging slot near the outer edge of an aperture to which a gripping handle fixed blade is pivoted. A containment space is formed by the junction of the gripping handle and a side of the fixed blade. The containment space has an arc-shaped opening, and the fixed blade has a positional aperture at a position corresponding to the opening. An end of an engaging member has an axle aperture and another end forms an engaging end, with a concave region formed between the two ends. A positioning pin passes through the engaging member and a torsion spring and is attached to the positional aperture. A push button-shaped body has a tongue at its lower end, an edge of which extends as a stop, and the tongue and the stop are both slidably mounted in the containment space.

6 Claims, 6 Drawing Sheets

U.S. PATENT DOCUMENTS

| | | | |
|---|---|---|---|
| D459,168 S * | 6/2002 | Meyerratken | D8/5 |
| D464,539 S * | 10/2002 | Richwine et al. | D8/5 |
| D464,541 S * | 10/2002 | Richwine et al. | D8/5 |
| D472,433 S * | 4/2003 | Richwine et al. | D8/5 |
| D476,199 S * | 6/2003 | Richwine et al. | D8/5 |
| D486,361 S * | 2/2004 | Wu | D8/5 |
| 6,725,547 B2 * | 4/2004 | Wu | 30/254 |
| D498,396 S * | 11/2004 | Overthun et al. | D8/5 |
| D499,316 S * | 12/2004 | Tatic | D8/5 |
| D499,317 S * | 12/2004 | Tatic | D8/5 |
| D500,235 S * | 12/2004 | Albert et al. | D8/5 |
| 6,860,018 B2 * | 3/2005 | Schneider et al. | 30/262 |
| D523,709 S * | 6/2006 | Knox | D8/5 |
| D537,311 S * | 2/2007 | Peterson et al. | D8/5 |
| D571,169 S * | 6/2008 | Pollock et al. | D8/5 |
| D578,841 S * | 10/2008 | Huang | D8/5 |
| D580,235 S * | 11/2008 | Wu | D8/5 |
| D580,236 S * | 11/2008 | Wu | D8/5 |
| D582,733 S * | 12/2008 | Davies et al. | D8/5 |
| D583,202 S * | 12/2008 | Nellenbach et al. | D8/5 |
| D595,100 S * | 6/2009 | Nellenbach et al. | D8/5 |
| D607,702 S * | 1/2010 | Wu | D8/5 |
| 7,640,667 B2 * | 1/2010 | Pollock et al. | 30/254 |
| D611,793 S * | 3/2010 | Trewartha et al. | D8/5 |
| 7,895,757 B1 * | 3/2011 | Huang | 30/250 |
| D635,417 S * | 4/2011 | Huang | D8/5 |
| D638,673 S * | 5/2011 | Huang | D8/5 |
| D638,674 S * | 5/2011 | Huang | D8/5 |
| 2006/0191142 A1* | 8/2006 | Jou | 30/262 |
| 2007/0144015 A1* | 6/2007 | Peterson et al. | 30/262 |
| 2008/0184567 A1* | 8/2008 | Jou | 30/262 |
| 2009/0090010 A1* | 4/2009 | Lin | 30/254 |
| 2011/0192035 A1* | 8/2011 | Chen | 30/251 |

FOREIGN PATENT DOCUMENTS

GB       2459449 A   * 10/2009

* cited by examiner

GARDEN SHEARS

BACKGROUND OF THE INVENTION

1. Field of the Invention

The present invention relates to garden shears, and, more particularly, to garden shears that utilize an interactive relationship between the slidable member and the engagement set, in which the slidable member is able to slide along a straight line to reduce static friction.

2. Description of the Related Art

Prior art garden shears, as shown in FIG. 6, are composed of upper and lower gripping handles 50,60 that are pivoted together, and also includes a spring 51. The spring 51 is disposed between the upper and lower gripping handles 50,60 and is used for pushing apart the upper and lower gripping handles 50,60, thereby biasing apart a blade base 52 and a blade 61. The upper gripping handle 50 has a pawl 53 located at the pivot position, and an axle aperture 531 of the pawl 53 is jacketed with a torsion spring 54. One end of the pawl 53 has a pushing surface 532, and a tongue 533 and a stop end 534 are formed on two sides of the pawl 53. The lower gripping handle 60 has a locking ratchet 62 corresponding to the pawl 53. When the blade base 52 and the blade 61 need to be closed together, a user grips and presses the upper and lower gripping handles 50,60 together so the blade base 52 and the blade 61 are closed together; the user then pushes the pawl 53 on the pushing surface 532 so the tongue 533 of the pawl 53 set within the ratchet slot 62 of the lower gripping handle 60. With the torsion spring 54 pushing against the tongue 533 of the pawl 53, the blade base 52 and the blade 61 are kept closed.

Based upon the above, certain drawbacks may easily occur as discussed in the following:

1. The upper gripping handle 50 is pivoted to the pawl 53, and the tongue 533 of the pawl 53 pushes against the locking ratchet 62 of the lower gripping handle 60. The pawl 53 swings around the axle aperture 531 and the pushing surface 532 slides in an arc-shaped path, which increases the static friction and makes the engagement movement more difficult.

2. The torsion spring 54 is disposed on the axle aperture 531 of the pawl 53, and one end of the torsion spring 54 is limited to an inside edge of the upper gripping handle 50 while the other end pushes against the stop end 534 of the pawl 53 to push the pawl 53 into the locking ratchet 62 of the lower gripping handle 60. However, in operation, if the pawl 53 is too loose, it may be pushed by the torsion spring 54 and move into the locking ratchet 62 of the lower gripping handle 60, which can cause difficulties during operation.

Therefore, it is desirable to provide garden shears to mitigate and/or obviate the aforementioned problems.

SUMMARY OF THE INVENTION

An embodiment garden shears comprises: a pressing handle, a gripping handle, an engagement set and a slidable member. The pressing handle is connected to a moveable blade and the moveable blade includes a hook-shaped engaging slot on the moveable blade close to the outer edge of a first aperture. A fixed blade of the gripping handler utilizes a second aperture that is pivoted to the first aperture. A containment space is formed by the junction of the gripping handle and a side of the fixed blade. The containment space has a narrowed portion and a first slot adjacent to the fixed blade. The containment space has an arc-shaped opening, and the fixed blade has a positional aperture at a position corresponding to the opening. The engagement set comprises an engaging member, an elastic member and a positioning pin. One end of the engaging member has an axle aperture and the other end forms an engaging end, and a concave region is formed between the two ends. The elastic member is a torsion spring which has a front stop and a rear stop at its two ends. The positioning pin passes through the engaging member and the elastic member and is attached to the positional aperture of the fixed blade. A slidable member has a push button-shaped body and a tongue at its lower end; an edge of the tongue extends as a stop, and a second slot is disposed between the stop and the push button-shaped body. The tongue of the slidable member and the stop are both slidably mounted in the containment space of the gripping handle.

The containment space is formed at the junction of the gripping handle and the fixed blade. The engaging member of the engagement set is disposed in the containment space, and the axle aperture of the engaging member is aligned with the positional aperture of the fixed blade The elastic member is disposed adjacent to an outer edge of the engaging member; its front stop end pushes against the lower end of the engaging member, and the rear stop end pushes against the gripping handle. The positioning pin passes through the elastic member and the axle aperture of the engaging member, and the positioning pin is riveted to the positional aperture of the fixed blade. The slidable member is able to slide with the first slot engaging with the narrowed portion of the gripping handle, and so the stop is disposed within the containment space. The tongue is also disposed within the containment space away from the engaging end of the engaging member. The end of the tongue pushes against the concave region of the engaging member. With the combination of the engagement set, the slidable member and the gripping handle, the second aperture of the fixed blade is pivoted to the first aperture of the pressing handle, and thus a cutting motion can be performed with the pivot position as a central axis. A spring is disposed between the pressing handle and the gripping handle, which is used for biasing the moveable blade and the fixed blade into an open state.

With the above-mentioned structure, following benefits are obtained:

The slidable member slides along the first slot of the gripping handle and utilizes the tongue to push against the concave region of the engaging member in the containment space. When the slidable member is pushed forward it pushes the engaging member against the engaging slot of the moveable blade; and with the interactive relationship between the slidable member and the engagement set, the slidable member is able to slide along a straight line to reduce static friction.

The elastic member of the engagement set pushes against the lower end of the engaging member, and the rear stop end pushes against the inside edge of the gripping handle. Therefore, the engaging end of the engaging member and the engaging slot of the moveable blade are kept open to prevent from the engaging end from accidentally sliding into the engaging slot.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
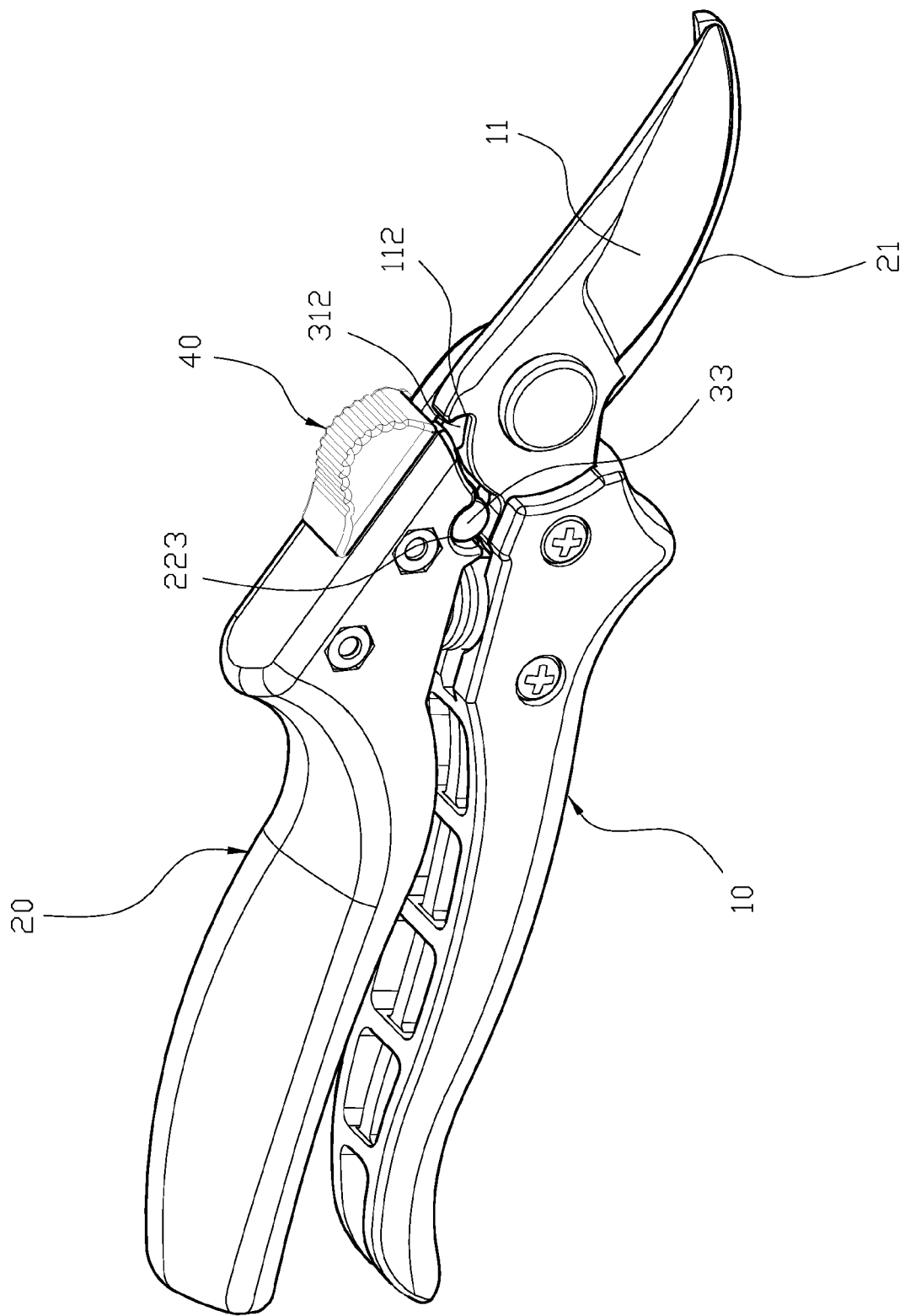
FIG. 1 is a perspective view of an embodiment of the present invention.
Figure 2:
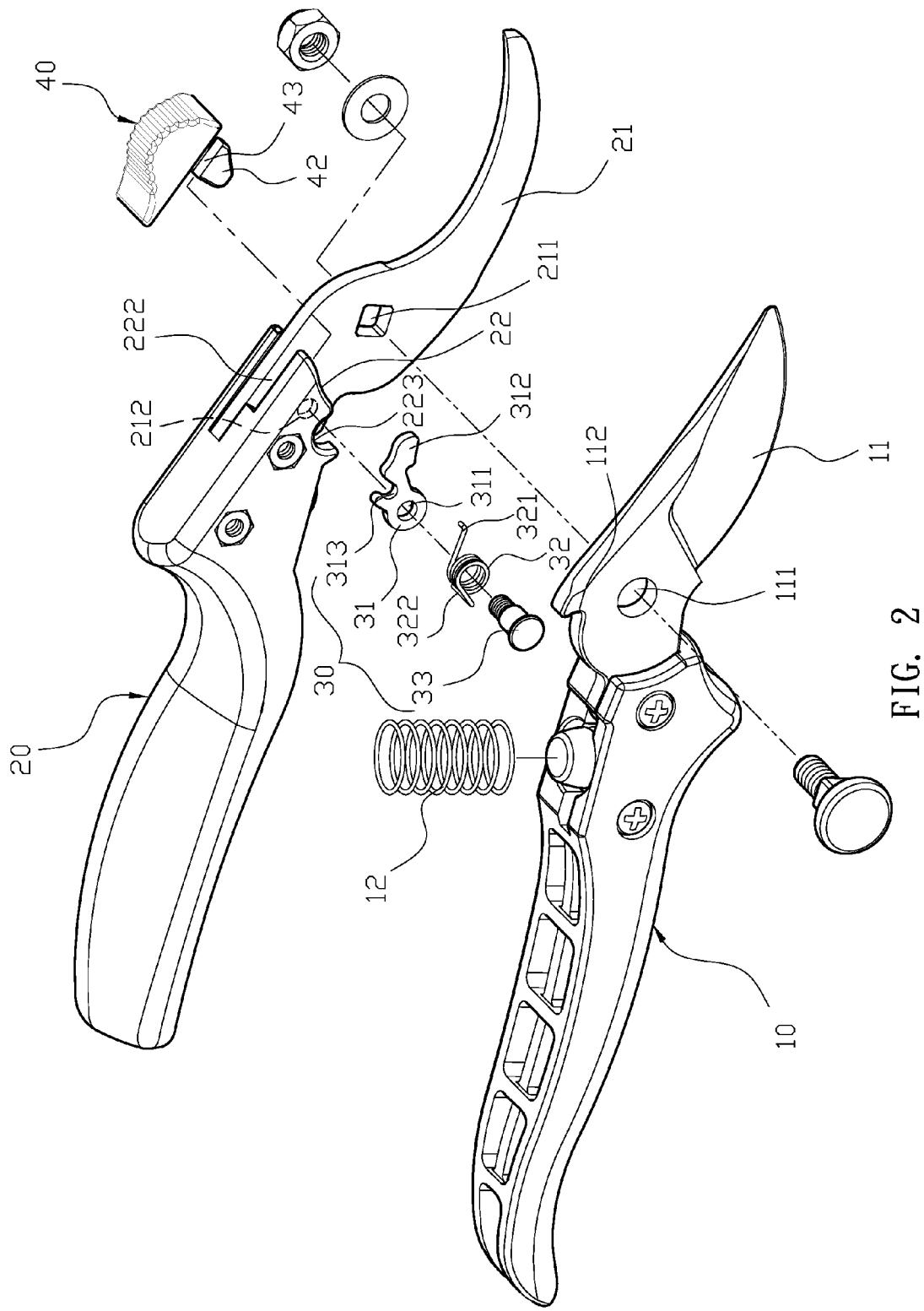
FIG. 2 is an exploded perspective view of an embodiment of the present invention.
Figure 3:
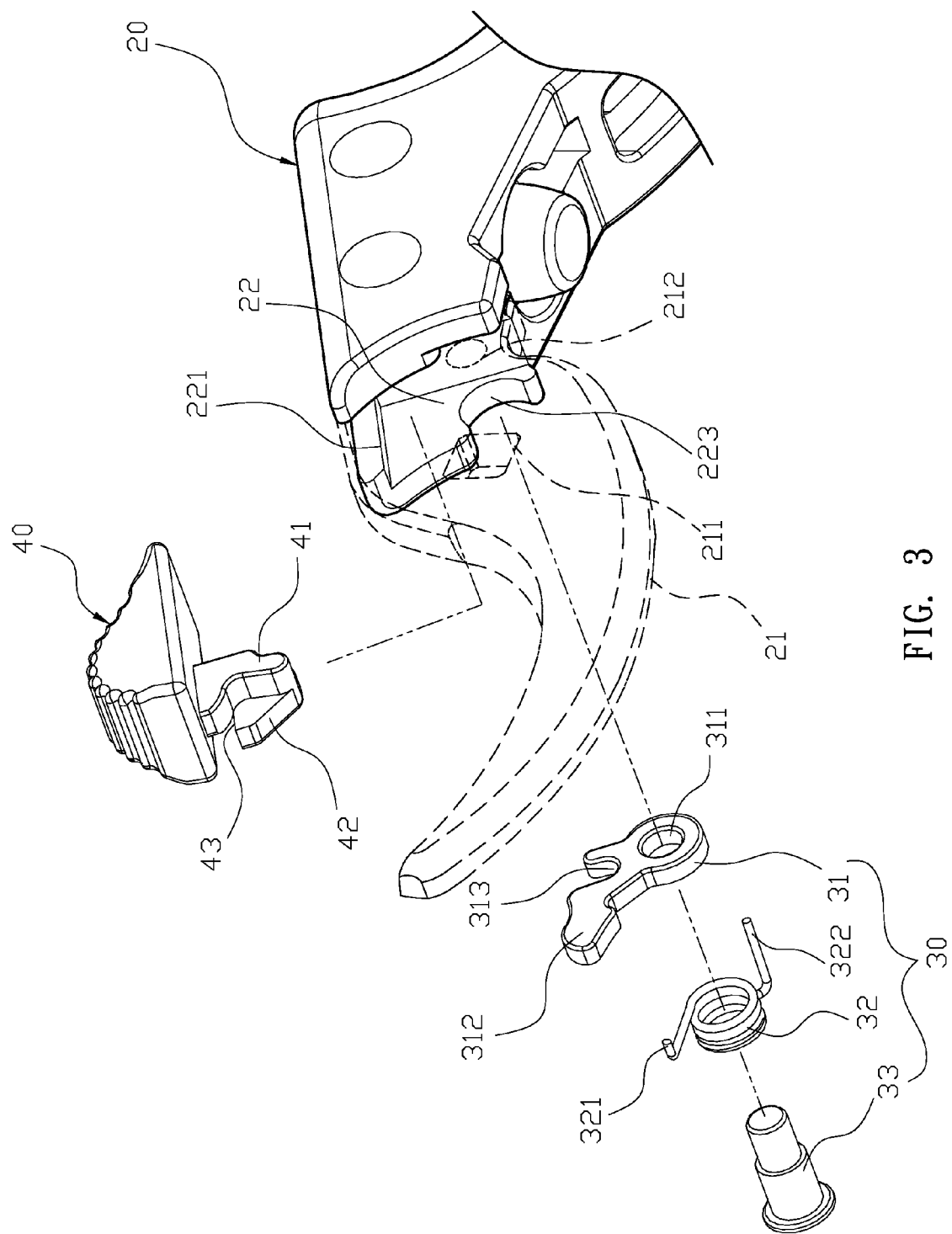
FIG. 3 is a detailed view of an embodiment of the present invention.

Please refer FIG. 1, FIG. 2 and FIG. 3. An embodiment garden shears comprises: a pressing handle 10, a gripping handle 20, an engagement set 30 and a slidable member 40. The pressing handle 10 is connected to a moveable blade 11 and the moveable blade 11 includes a hook-shaped engaging slot 112 on the moveable blade 11 close to the outer edge of a first aperture 111. A fixed blade 21 of the gripping handle 20 utilizes a second aperture 211 that is pivoted to the first aperture 111. A containment space 22 is formed by the junction of the gripping handle 20 and a side of the fixed blade 21. The containment space 22 has a narrowed portion 221 and a first slot 222 adjacent to the fixed blade 21. The containment space 22 has an arc-shaped opening 223, and the fixed blade 21 has a positional aperture 212 at a position corresponding to the opening 223. The engagement set 30 comprises an engaging member 31, an elastic member 32 and a positioning pin 33. One end of the engaging member 31 has an axle aperture 331 and the other end forms an engaging end 312, and a concave region 313 is formed between the two ends. The elastic member 32 is a torsion spring which has a front stop 321 and a rear stop 322 at its two ends. The positioning pin 33 passes through the engaging member 31 and the elastic member 32 and is attached to the positional aperture 212 of the fixed blade 21. A slidable member 40 has a push button-shaped body and a tongue 41 at its lower end; an edge of the tongue 41 extends as a stop 42, and a second slot 43 is disposed between the stop 42 and the push button-shaped body. The tongue 41 of the slidable member 40 and the stop 42 are both slidably mounted in the containment space 22 of the gripping handle 20.

Figure 4:
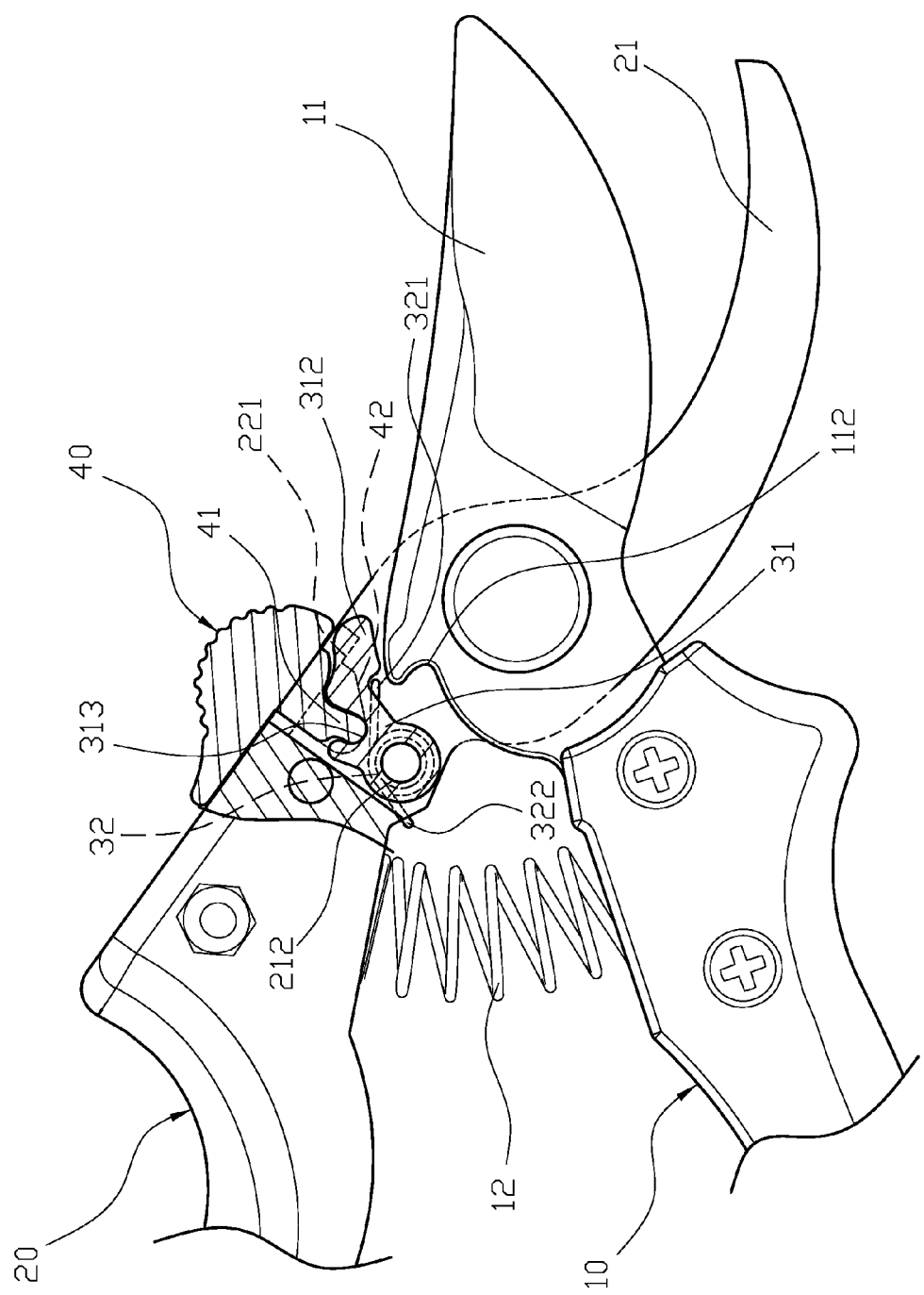
FIG. 4 is a schematic drawing of an engagement set being opened according to an embodiment of the present invention.

For the structure of the garden shears, please refer to FIG. 2, FIG. 3 and FIG. 4. The containment space 22 is formed at the junction of the gripping handle 20 and the fixed blade 21. The engaging member 31 of the engagement set 30 is disposed in the containment space 22, and the axle aperture 311 of the engaging member 31 is aligned with the positional aperture 212 of the fixed blade 21. The elastic member 32 is disposed adjacent to an outer edge of the engaging member 31; its front stop end 321 pushes against the lower end of the engaging member 31, and the rear stop end 322 pushes against the gripping handle 20. The positioning pin 33 passes through the elastic member 32 and the axle aperture 311 of the engaging member 31, and the positioning pin 33 is riveted to the positional aperture 212 of the fixed blade 21. The slidable member 40 is able to slide with the first slot 43 engaging with the narrowed portion 221 of the gripping handle 20, and so the stop 42 is disposed within the containment space 22. The tongue 41 is also disposed within the containment space 22 away from the engaging end 312 of the engaging member 31. The end of the tongue 41 pushes against the concave region 313 of the engaging member 31. With the combination of the engagement set 30, the slidable member 40 and the gripping handle 20, the second aperture 211 of the fixed blade 21 is pivoted to the first aperture 111 of the pressing handle 10, and thus a cutting motion can be performed with the pivot position as a central axis. A spring 12 is disposed between the pressing handle 10 and the gripping handle 20, which is used for biasing the moveable blade 11 and the fixed blade 21 into an open state.

Figure 5:
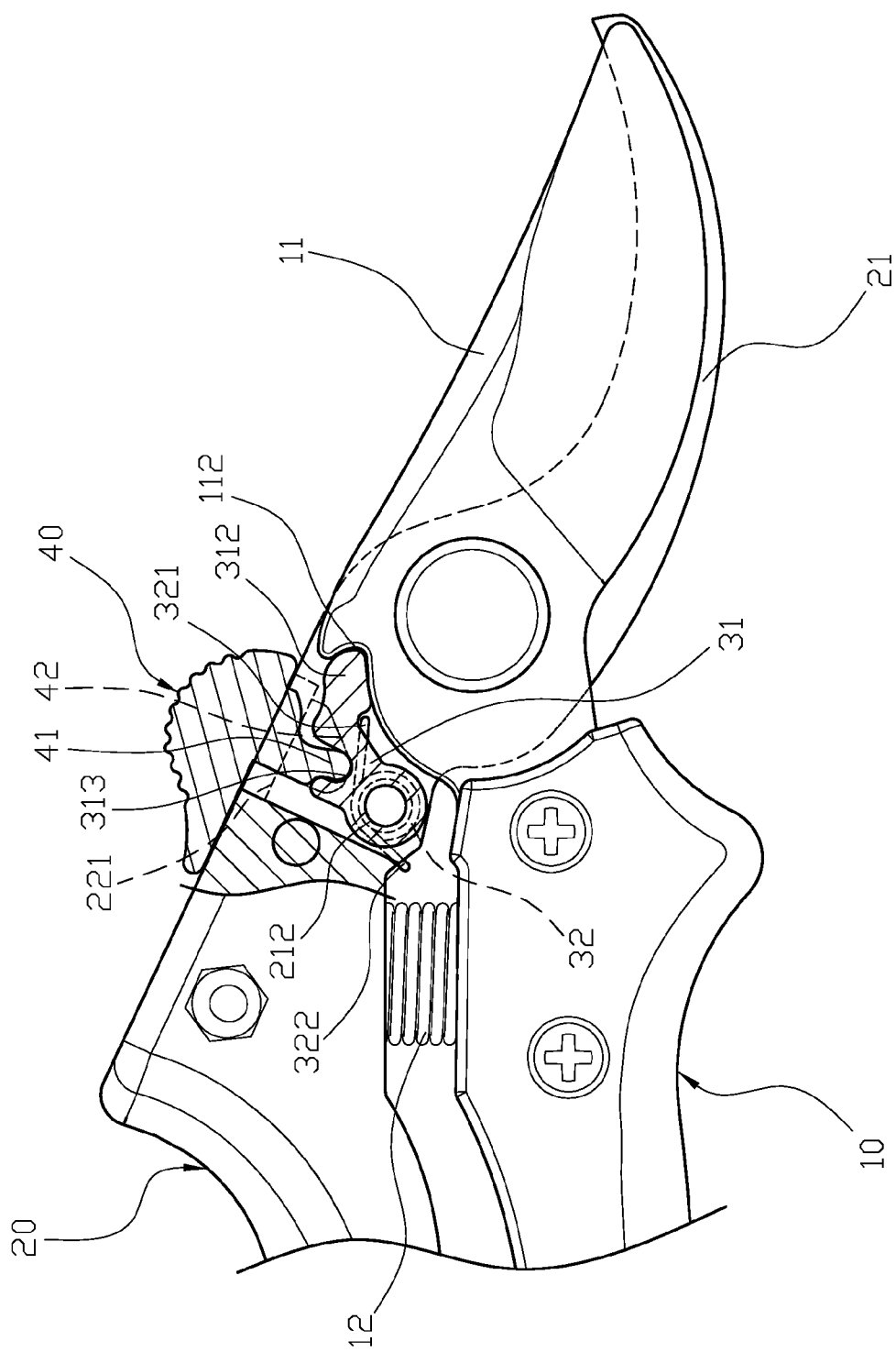
FIG. 5 is a schematic drawing of the engagement set being closed according to an embodiment of the present invention.
Figure 6:
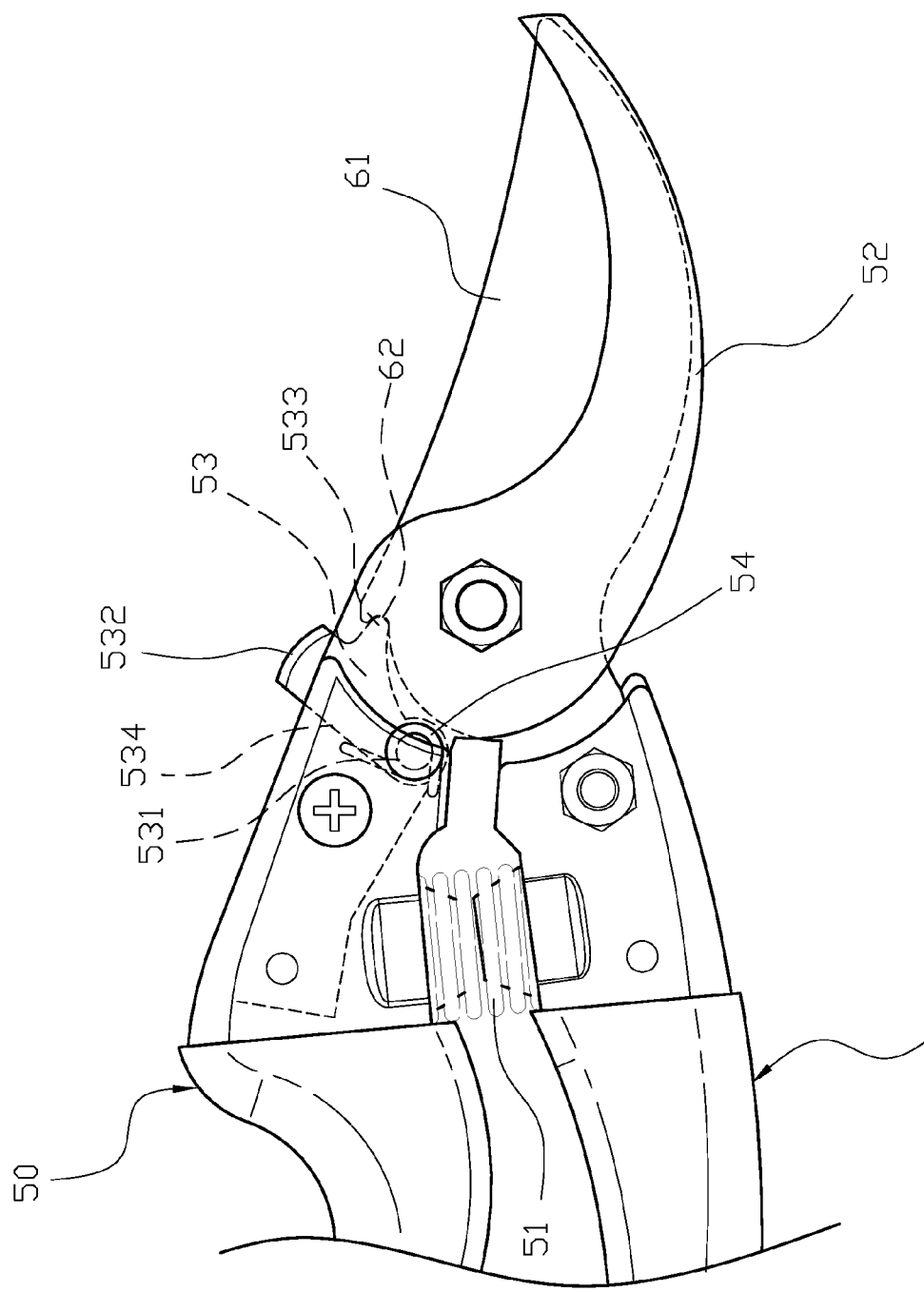
FIG. 6 is a schematic of a prior art shears in a closed position.

For actual operations, please refer to FIG. 3, FIG. 4 and FIG. 5. The spring 12 is disposed between the pressing handle 10 and the gripping handle 20 to keep the moveable blade 11 and the fixed blade 21 away from each other. After using the garden shears, the moveable blade 11 and the fixed blade 21 may need to be closed together to prevent accidental cutting by the blades. In order to close the garden shears, the user grips the pressing handle 10 and the gripping handle 20 together to compress the spring 12 and then pushes the slidable member 40 so that the first slot 43 of the stop 42 slides along the narrowed portion 221 of the gripping handle 20 until the tongue 41 pushes against the concave region 313 of the engaging member 31 so that the engaging member 31 rotates around the axis aperture 311 and the engaging end 312 swings forward to pass into the engaging slot 112 of the moveable blade 11. Under the force between the pressing handle 10 and the gripping handle 20, the engaging end 312 is pushed into the engaging slot 112 to complete the closing motion of the blades. In order to open the blades, the user squeezes together the pressing handle 10 and the gripping handle 20 together so that the compressive force between the engaging end 312 of the engaging member 31 and the engaging slot 112 of the moveable blade 11 is reduced and it is thus easy to push back the slidable member 40 and then open the blades.

With the above-mentioned structure, the following benefits are obtained:

The slidable member 40 slides along the first slot 222 of the gripping handle 20 and utilizes the tongue 41 to push against the concave region 313 of the engaging member 31 in the containment space 22. When the slidable member 40 is pushed forward it pushes the engaging member 31 against the engaging slot 112 of the moveable blade 11; and with the interactive relationship between the slidable member and the engagement set, the slidable member is able to slide along a straight line to reduce static friction.

The elastic member 32 of the engagement set 30 pushes against the lower end of the engaging member 31, and the rear stop end 322 pushes against the inside edge of the gripping handle 20. Therefore, the engaging end 312 of the engaging member 31 and the engaging slot 112 of the moveable blade 11 are kept open to prevent from the engaging end 312 from accidentally sliding into the engaging slot 112.

Although the present invention has been explained in relation to its preferred embodiment, it is to be understood that many other possible modifications and variations can be made without departing from the spirit and scope of the invention as hereinafter claimed.

What is claimed is:

1. Garden shears comprising
a pressing handle;
a gripping handle;
an engagement set;
a movable blade with a first aperture and a hook-shaped engaging slot adjacent to an outer edge of the first aperture;
a fixed blade with a second aperture and a positional aperture;
wherein the pressing handle is connected to the movable blade, the gripping handle is connected to the fixed blade, and the movable blade is pivotally connected to the fixed blade via the first and second apertures;

a containment area at a junction of the gripping handle and a side of the fixed blade, the containment area having a narrowed portion, a first slot adjacent the fixed blade, and an arc-shaped opening, wherein a position of the positional aperture on the fixed blade corresponds to the arc-shaped opening;

an engagement set having an engaging member, an elastic member, and a positioning pin, the engaging member on one end having an axle aperture, on another end having an engaging end, and a concave region disposed between the two ends; the elastic member having a front stop end and a rear stop end; the positioning pin extends through the axle aperture and the elastic member and is attached to the positional aperture of the fixed blade;

a slidable member having a push button-shaped body and a tongue at a lower end, an edge of the tongue extending as a stop, a second slot disposed between the stop and the push button-shaped body, the tongue and the stop are both slidably received within the containment area, wherein the tongue is received by the concave region of the engaging member; and wherein the slidable member slides along a straight line and pushes the engaging end of the engaging member against the engaging slot of the movable blade.

2. The garden shears as claimed in claim 1, wherein the elastic member is disposed at an outer edge of the engaging member and the front stop end pushes against the another end of the engaging member while the rear stop end pushes against the gripping handle.

3. The garden shears as claimed in claim 1, wherein the attachment between the positioning pin and the positional aperture is a riveted attachment.

4. The garden shears as claimed in claim 1, wherein a spring is disposed between the pressing handle and the gripping handle, which is used for biasing the moveable blade and the fixed blade into an open state.

5. The garden shears as claimed in claim 1, wherein the elastic member is a torsion spring.

6. The garden shears as claimed in claim 1, wherein the elastic member is a torsion spring.

* * * * *